US006820931B2

(12) United States Patent
Ruff et al.

(10) Patent No.: US 6,820,931 B2
(45) Date of Patent: Nov. 23, 2004

(54) ENERGY ABSORBER

(75) Inventors: Steven Anthony George Ruff, Buckinghamshire (GB); Graham Philip Hartnell, Bucks (GB)

(73) Assignee: Martin-Baker Aircraft Company, Limited, Middlesex (GB)

( * ) Notice: Subject to any disclaimer, the term of this patent is extended or adjusted under 35 U.S.C. 154(b) by 128 days.

(21) Appl. No.: 09/977,506

(22) Filed: Oct. 12, 2001

(65) Prior Publication Data

US 2002/0079725 A1 Jun. 27, 2002

(30) Foreign Application Priority Data

Oct. 13, 2000 (GB) .............................................. 0025188

(51) Int. Cl.⁷ ............................ B60N 2/42; B60R 21/02
(52) U.S. Cl. ................................................. 297/216.17
(58) Field of Search ............................ 297/472, 216.17

(56) References Cited

U.S. PATENT DOCUMENTS

| | | | | |
|---|---|---|---|---|
| 3,059,966 A | * | 10/1962 | Spielman | 297/216.17 |
| 3,354,990 A | * | 11/1967 | Stahl | 297/216.17 |
| 3,985,388 A | * | 10/1976 | Hogan | 297/216.77 |
| 4,358,154 A | * | 11/1982 | Campbell | 297/216.17 |
| 4,523,730 A | * | 6/1985 | Martin | 297/216.17 |
| 4,525,010 A | * | 6/1985 | Trickey et al. | 297/216.17 |
| 5,273,240 A | * | 12/1993 | Sharon | 297/216.17 X |
| 5,558,301 A | * | 9/1996 | Kerdoncuff et al. | 297/216.17 X |
| 5,676,336 A | * | 10/1997 | Nefy et al. | 297/216.17 X |
| 6,378,939 B1 | * | 4/2002 | Knoll et al. | 297/216.17 X |
| 6,394,393 B1 | * | 5/2002 | Mort | 297/216.17 X |
| 6,409,243 B1 | * | 6/2002 | Hansen | 297/216.17 X |

FOREIGN PATENT DOCUMENTS

DE P 19 33 524.1 1/1971

* cited by examiner

*Primary Examiner*—Peter R. Brown
*Assistant Examiner*—Rodney B. White
(74) *Attorney, Agent, or Firm*—Fulwider Patton Lee & Utecht, LLP

(57) ABSTRACT

An energy absorber for absorbing energy of a vehicle or component of a vehicle or occupant of the vehicle in a crash situation so as to allow relatively gradual deceleration of the vehicle, component or occupant, the energy absorber including a first part, a second part and an elongate deformable member secured to the first part and extending through a deforming arrangement carried by the second part, whereby said elongate deformable member normally acts as a tie or strut between said first part and said second part but wherein the arrangement is such that, when the force acting between said first part and second part in a predetermined direction exceeds a predetermined amount, said elongate deformable member is thereby forced progressively through said deforming arrangement as the distance between said first part and said second part changes and the deformable member is thereby forced to undergo plastic deformation, whereby energy is absorbed, and wherein said deforming arrangement is such as to effect such plastic deformation substantially without changing the material cross sectional area of the deformable member.

4 Claims, 3 Drawing Sheets

Figure 4:
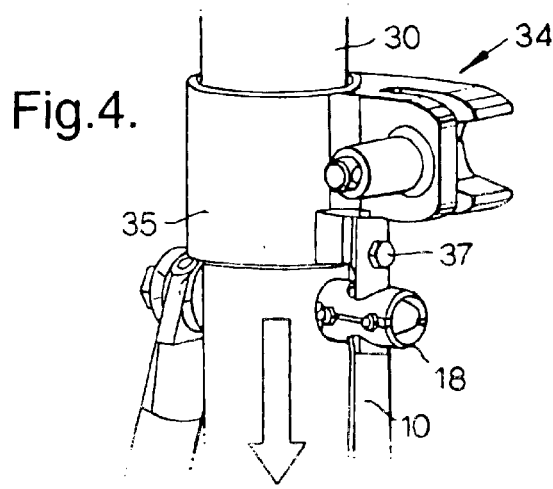

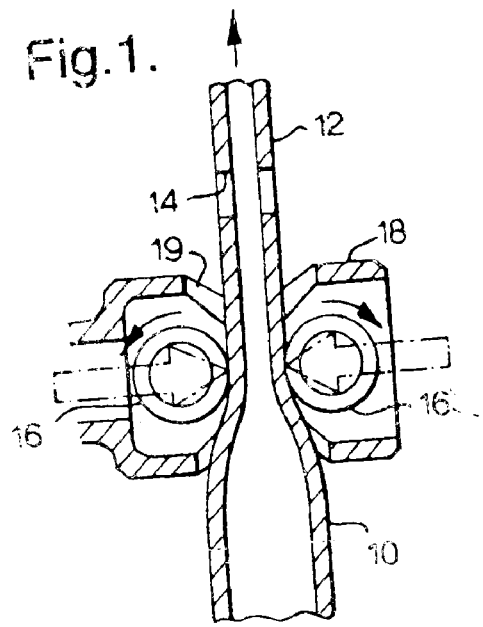
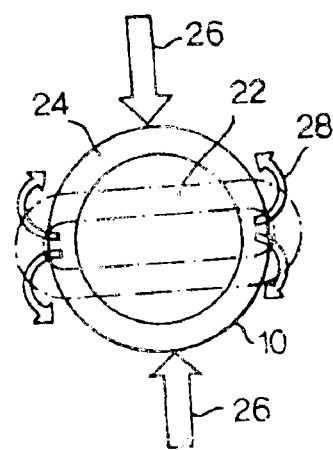
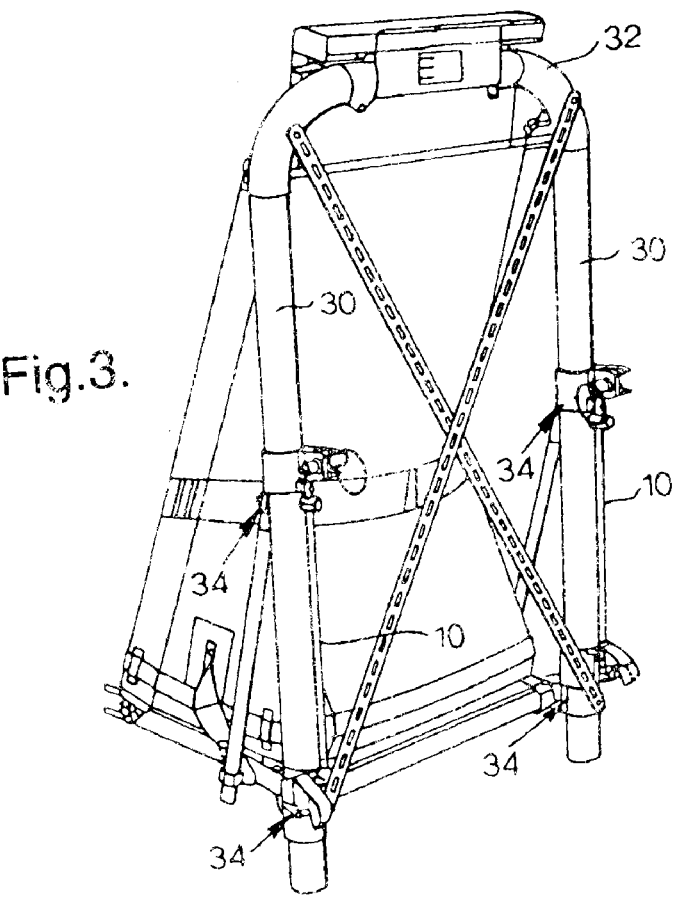

ENERGY ABSORBER

This invention relates to an energy absorber for absorbing energy of a vehicle or component of a vehicle or occupant of a vehicle in a crash situation so as to allow relatively gradual deceleration of the vehicle, component or occupant.

The invention is of particular, but not exclusive, utility in relation to so-called crashworthy seats for helicopters. In the typical scenario of a helicopter crash, impact with the ground is preceded by a substantially vertical drop, with the result that a seated occupant of a helicopter experiences high spinal loads and pelvic deceleration during such a crash due to the sudden arresting of vertical downward motion. It has long been recognised that spinal injuries to occupants of helicopters in such a crash scenario can be minimised by seat arrangements which limit the deceleration to which the seated occupant is subjected, relative to the helicopter, to a predetermined maximum, by allowing downward movement of the seated occupant relative to the helicopter, at the time of impact with the ground, under a restraining force which, over a limited range of such movement, is limited to a predetermined maximum. In practice, significant benefits, in the way of reduced injuries and reduced seriousness of injuries, can be afforded in this way in such crash situations even where the extent of such controlled vertical movement permitted by the crashworthy seat arrangement is quite limited.

Many different types of energy absorbers for such purposes have been proposed and manufactured. Many of these prior energy absorbers utilise plastic deformation of metal parts as a means of absorbing energy.

However, there still exists a need for an improved energy absorber which is better able than existing energy absorbers to meet one or more of the following desiderata:

The device should provide a predictable force versus deformation trace.

The rapid loading rate expected in crashes should not cause unexpected changes in the force versus deformation characteristic of the device.

The device should have the ability to sustain tension and compression to provide anti-rebound characteristics.

The device should be as light and small as possible.

The device should be economical.

The device should be capable of being relied upon to perform satisfactorily throughout the life of the product (a minimum of 10 years or 8000 flight hours) without requiring maintenance.

The device should not be affected by vibration, dust, dirt, temperature or other environmental effects.

The device should be protected from corrosion.

The device should not use friction as a major force component in the energy absorber, as friction can vary greatly over different environmental conditions, and thus greatly affect the performance of the energy absorber to the possible determent of the occupant of a seat fitted with such an energy absorber, for example.

When used in, for example, a crashworthy helicopter seat, the device should decelerate the occupant of such seat in the most efficient manner possible while keeping the loads to which the occupant is subject within the limits of human tolerance.

It is a further object of the invention to provide a reliable, efficient and cost-effective energy absorber.

In accordance with one aspect of the invention there is provided an energy absorber for absorbing energy of a vehicle or component of a vehicle or occupant of the vehicle in a crash situation so as to allow relatively gradual deceleration of the vehicle, component or occupant, the energy absorber including a first part, a second part and an elongate deformable member secured to the first part and extending through a deforming arrangement carried by the second part, whereby said elongate deformable member normally acts as a tie or strut between said first part and said second part but wherein the arrangement is such that, when the force acting between said first part and second part in a predetermined direction exceeds a predetermined amount, said elongate deformable member is thereby forced progressively through said deforming arrangement as the distance between said first part and said second part changes and the deformable member is thereby forced to undergo plastic deformation, whereby energy is absorbed, and wherein said deforming arrangement is such as to effect such plastic deformation substantially without changing the material cross sectional area of the deformable member.

According to another aspect of the invention there is provided a vehicle seat assembly including a seat mounting secured to or securable to, structure of the vehicle, a seat proper including one or more body supporting parts, the seat proper being mounted for guided movement relative to said structure and at least one energy absorber according to the first-mentioned aspect of the invention having said first part thereof connected to one of said seat mounting and seat proper and having said second part connected to the other of said seat mounting and said seat proper, whereby the energy absorber normally restrains movement of the seat proper relative to the seat mounting but, in a crash situation, can allow controlled movement of the seat proper relative to the seat mounting, whilst absorbing energy as the elongate deformable member is forced through the deforming arrangement or as the deforming arrangement is forced along the elongate deformable member.

The invention also extends to a vehicle, such as a helicopter, provided with a seat assembly in accordance with the invention.

Figure 5:
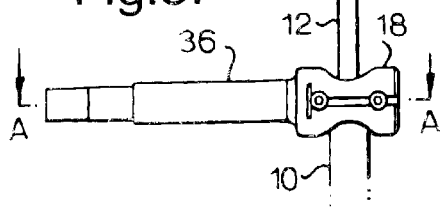
Figure 7:
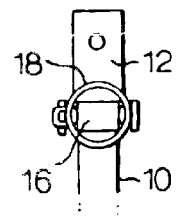
Figure 6:
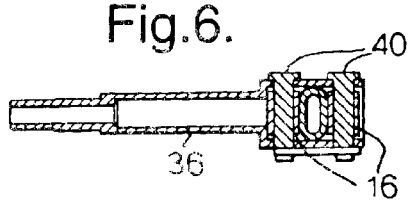
Figure 8:
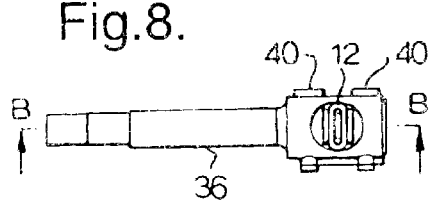
Figure 9:
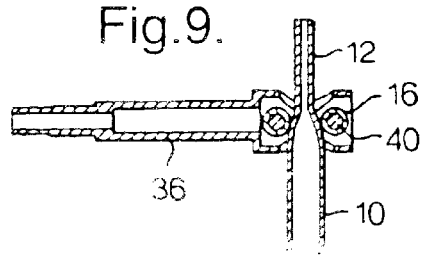
Figure 10:
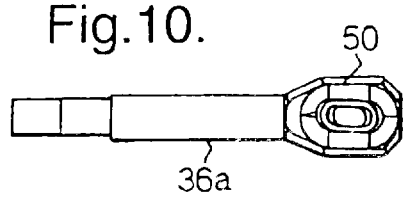
Figure 12:
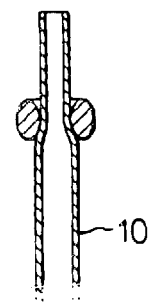
Figure 11:
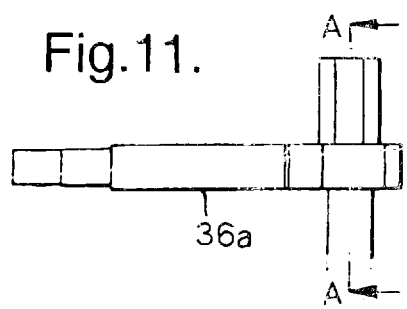
Figure 13:
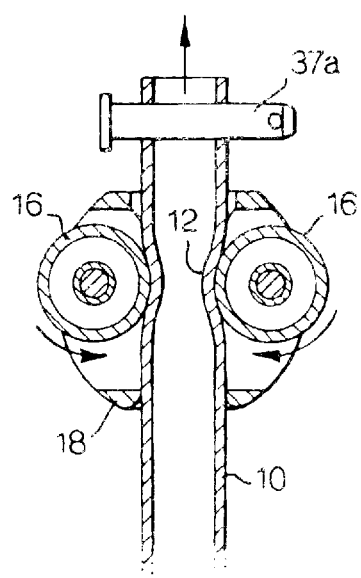
Figure 14:
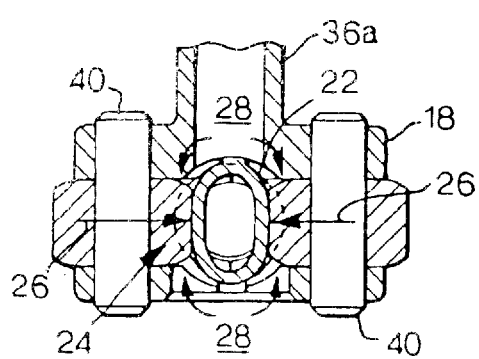

Embodiments of the invention are described below by way of example with reference to the accompanying drawings in which:

FIG. 1 is a schematic view in vertical section illustrating the operation of a first embodiment of energy absorber in accordance with the invention, FIG. 2 is a schematic cross-sectional diagram illustrating the operation of the energy absorbing mechanism utilised in the first embodiment, FIG. 3 is a partial perspective view of a helicopter seat fitted with energy absorbers in accordance with the first embodiment of the invention, FIG. 4 is a fragmentary perspective view of the seat of FIG. 3, to an enlarged scale as compared with FIG. 3, showing part of the seat structure and part of the energy absorber, FIG. 5 is a side elevation view of part of the energy absorber of FIG. 1, FIG. 6 is a view in horizontal section along the line A-A in FIG. 5, FIG. 7 is an end view of the part of the energy absorber shown in FIG. 5, FIG. 8 is a plan view of the part of the energy absorber shown in FIG. 5, FIG. 9 is a vertical section view, along the line B-B in FIG. 8, FIG. 10 is a plan view, corresponding to FIG. 8, but showing part of an alternative energy absorber in accordance with the invention, FIG. 11 is a side view of the part shown in FIG. 10, FIG. 12 is a view in vertical section along the line A-A of FIG. 11, FIG. 13 is a vertical section view corresponding to FIG. 1 of a variant energy absorber embodying the invention, and FIG. 14 is a horizontal section view of the variant of FIG. 13.

In the embodiment of the invention illustrated in FIGS. 1 to 9, in operation, energy is absorbed, as in many prior art energy absorbers, by plastic deformation of metal. In the embodiments of the invention to be described, the plastic deformation in question is a progressive flattening of a deformable metal tube, herein referred to as an attenuation tube, as it is pulled through a deforming arrangement comprising a pair of opposed rollers, the spacing between which is less than the diameter of the tube. In the use of this device to absorb the kinetic energy of the occupant of a helicopter seat, as explained in more detail below, the seat is mounted for vertical sliding movement in seat-mounting brackets secured to the helicopter structure but is normally restrained against such movement by a pair of energy absorbers of the kind illustrated in FIG. 1 and in each of which the deformable tube is secured to a respective seat-mounting bracket fixed to the helicopter structure, whilst the deforming arrangement, including the opposing rollers, is fixed to the frame of the seat, so as to move downward along the deformable tube, deforming the same, when the seat is moved downwards, relative to the aircraft structure, by the momentum of the seat and its occupant when, in a crash situation, the helicopter strikes the ground.

Referring to FIG. 1, the deformable metal tube 10 is, over most of its length, cylindrical and circular in cross-section as illustrated in solid lines in FIG. 2. Only an upper portion of this cylindrical part is shown in FIG. 1. An upper end region of the tube 10 is flattened as indicated at 12 and has a transverse bore 14 therethrough, along an axis extending in the direction in which the flattened part 12 of the tube has its shortest cross-sectional dimension, the bore 14 receiving a securing pin (not shown in FIG. 1), by means of which the upper end of the tube 10 is fixed relative to the helicopter structure by way of a respective seat mounting bracket secured to such structure. It will be understood that for practical purposes, except in a crash situation, the part of the seat which directly engages the body of the seated occupant, and which part is also referred to herein as the seat proper, and which typically comprises a seat pan and a seat back, and the seat mounting brackets referred to, together form a seating unit supplied as a unit and adapted to be installed as a whole in the helicopter. However, for convenience, the seat proper is referred to herein as the "seat" and is referred to as being slidable relative to said "seat mounting brackets". The opposing rollers, indicated at 16 in FIG. 1 are rotatedly mounted on journal pins in a housing 18 having a transverse through passage 19, aligned with the gap between the rollers and through which the flattened upper end 12 of the tube 10 can be passed during assembly. As illustrated in FIG. 1, the minimum transverse dimension of the flattened region 12 of the tube is less than the spacing between the opposing rollers 16 but the outside diameter of the cylindrical part of the tube 10 is significantly greater than that spacing. Accordingly, the tube 10 cannot be drawn further upward relative to the rollers 16 and housing 18, in the arrangement illustrated in FIG. 1, without deformation of the cylindrical portion of the tube 10. The axial length of each of the rollers 16 and the dimension, parallel with the axes of the rollers, of the aperture or passage 19 through the housing 18 through which the tube passes is, however, greater than the maximum transverse dimension of the flattened portion 12 of the tube and, indeed, greater than the maximum transverse dimension which the tube will have after it has been drawn through the space between the cooperating rollers 16. Consequently, as illustrated in FIG. 2, the nature of the plastic deformation of the tube 10 during such flattening of the tube comprises a flattening of two opposing sections of the wall of the tube and a bending or increasing in curvature of the portions of the wall of the tube connecting the first mentioned opposing wall sections of the tube, as illustrated in FIG. 2 in which the flattened cross-section of the tube is indicated in broken lines at 22, and in which the original, undeformed, cylindrical cross-section of the tube is indicated in solid lines at 24. In FIG. 2, the arrows 26 represent the forces applied to opposing sides of the tube by the rollers 16, during the deformation of the tube whilst the arrows 28 illustrate the bending moments and stresses developed in the region of the tube where the curvature (as viewed in transverse section) is increased. Thus, in operation of the embodiment of the invention illustrated in FIGS. 1 and 2, energy is absorbed by bending of the tube wall by the rollers 16 as opposed to the swaging or die drawing of metal rods typically used in known arrangements, in which the primary mechanism for energy absorption is the compression of the material to reduce its cross section. As a result, in the embodiments of the invention illustrated in FIGS. 1 and 2, friction between the parts of the energy absorber which move relative to one another in operation of the energy absorber is much reduced, (because such friction is primarily rolling friction) as compared with such prior art arrangements. Furthermore, the material cross-sectional area of the tube 10, that is to say the annular area, in cross-section, bounded by on the one hand, the outer periphery of the tube, and, on the other hand its inner periphery, i.e. the area of solid metal in such cross-section, is substantially unchanged during such deformation of the tube.

As illustrated in FIG. 3, a crashworthy helicopter seat incorporating energy absorbers of the type described with reference to FIGS. 1 and 2, comprises a back frame providing, on either side of the seat back, a respective straight vertical cylindrical frame member 30, the two members 30 being parallel with one another and being connected at their upper ends by a curved top member 32. The seat is mounted on the aircraft structure (not shown), for example on a wall or bulkhead in the helicopter, by, in the example shown, two pairs of seat mounting brackets 34, one pair to each member 30, each such bracket 34 providing a collar or sleeve 35 (see FIG. 4) extending around the respective member 30 in such a manner as to permit, in the absence of other restraint, vertical sliding movement of the member 30 relative to the bracket 34. Each bracket 34, as shown to a larger scale in FIG. 4, further incorporates structure adapted to be fixed, for example by bolts, to the aircraft wall or bulkhead. In the arrangement illustrated in FIG. 3, a respective energy absorber of the kind described with reference to FIGS. 1 and 2, is provided on each side of the seat back, each energy absorber having the upper end 12 of its tube 10 fixed by a transverse bolt 37 to the respective upper fixed bracket 34 and having the housing 18 of its deforming arrangement secured to the respective member 30. In the preferred embodiment, the housing is formed by the head of a hollow bolt or carriage 36, (FIGS. 5, 6, 8 and 9) the shank of which is extended through a horizontal transverse bore in the respective member 30. The end of the bolt 36 remote from the head may be externally screw threaded to receive a nut whereby the bolt 36 is secured in the member 30. The head 18 of the bolt is substantially in the form of a hollow cylinder open at its outer free end and having a bore therethrough, extending perpendicular to the axis of pin 36, vertically in the assembly shown in FIG. 3 and intersecting the axial bore which defines the interior space of the head 18 of the bolt 36. This bore perpendicular to the axis of pin 36 defines the passage 19 referred to above. The head 18 of the pin 36 is further provided with an aperture or apertures extending transversely through the head 18, perpendicular to the vertical bore 19 and on either side of the axis of the bore 19, to receive journal pins 40 upon which are rotatably mounted, within the housing 18, respective ones of the rollers 16, which are of hollow cylindrical form. The transverse bores to receive the pins 40 may be simple cylindrical bores or alternatively the pins 40 may be received in respective longitudinal slots on either side of the housing 18 to allow a measure of adjustment of one of the rollers relative to the other to vary the spacing therebetween.

It will be appreciated that with the arrangement illustrated, the seat frame is in effect normally suspended from the upper seat mounting brackets 34 by the flattened upper end portions 12 of the two energy absorbers, since the deforming arrangement, including the rollers 16, is fastened to the seat structure, which is prevented from moving vertically through the seat mounting brackets by the rollers 16 engaging the shoulder formed on the deformable tube 10 where the cylindrical part merges with the flattened part 12.

During a crash in which downward movement of the aircraft is arrested by impact with the ground, the seat structure, impelled by its own downward momentum and that of the occupant, moves through the upper and lower seat mounting collars or sleeves 35 provided by brackets 34, using them as a linear bearing which guides the seat structure in its downward path relative to the aircraft.

The downward motion of the seat pulls the roller assembly 16, 16 over the attenuation tube 10, deforming it as it passes, limiting the deceleration experienced by the occupant to a predetermined tolerable value.

Referring to FIGS. 10 to 12, whilst it is preferred to use a deforming arrangement incorporating rollers, in order to ensure that the (unpredictable) sliding friction between the deformable tube and the deforming assembly forms a relatively insignificant part of the energy absorbing mechanism, for simplicity or economy, the deforming assembly incorporating rollers may be replaced by a deforming assembly utilising a fixed member 50, referred to below, for convenience, as a die, affording a forming orifice through which the tube 10 extends and which forming orifice, as viewed along the axis of the deformable tube 10, is transversely elongate with a minimum dimension substantially less than the diameter of the unflattened deformable tube, so that in pulling the deformable tube through the forming orifice, it will be plastically deformed, by being flattened, to absorb energy. Preferably the greatest transverse dimension of the forming orifice is greater than the greatest transverse dimension of the flattened tube so that the character of the deformation to which the tube is subjected will be substantially the same as described with reference to FIG. 2 even though there will, of course, be a somewhat greater frictional force component between the deformable tube and the die as the tube is drawn through the die, as compared with the roller arrangement of FIGS. 1 to 9.

As in FIGS. 6 to 9, in the variant of FIGS. 10 to 12, the assembly which deforms the deformable tube is carried in the head of a bolt, referenced 36a, which is extended through the respective member 30 transversely. In FIGS. 10 to 12, the forming orifice is elongate in the direction of the longitudinal axis of this bolt 36a so that the major axis of the cross-section of the flattened deformable tube 10 resulting from operation of the arrangement of FIGS. 10 to 12 will be perpendicular to that resulting from operation of the device of FIGS. 5 to 9. However, if desired, the head of the bolt shown in FIGS. 10 to 12 could be arranged, instead, to support the "die" so that the forming orifice had its widest dimension perpendicular to the axis of the bolt 36a.

FIGS. 13 and 14 illustrate, in partial vertical and horizontal section respectively, a variant of the energy absorber of FIGS. 1 to 9, and which differs from the latter arrangement in having, carried by a hollow pin 36a corresponding to bolt 36 in FIGS. 5 to 9, two opposing rollers 16 of which the rotational axes are parallel with the axis of the hollow pin 36a. In this variant, the rollers 16 are mounted in a head portion 18 of the pin 36a, the form of which head portion will be apparent from FIGS. 13 and 14.

Similarly to the embodiment of FIGS. 1 to 9, the hollow pin 36a, in use, is extended through a transverse bore through the respective member 30. Preferably the end (not shown) of the hollow pin 36a has a transverse bore to receive a split pin or spring clip to hold the pin 36a in place, after the shank of the pin 36a has been extended through member 30. As illustrated in FIG. 13, the upper end of the attenuation tube 10 in this variant is likewise preferably secured to the respective seat mounting bracket (not shown) by a retaining pin 37a having a transverse bore at its free end and to receive a split pin or spring clip.

In FIG. 14, as in FIG. 2, the deformed and undeformed profile of the attenuation tube in section are indicated at 22 and 24 respectively and the arrows 26 and 28 have the same significance as in FIG. 2.

The energy absorption of the arrangement described with reference to FIGS. 1 to 9 or 13 and 14 or with reference to FIGS. 10 to 12, or with reference to FIGS. 13 and 14, per unit of movement of the deformable tube through the deforming arrangement, may be adjusted or selected in any of various ways. For example, deformable tubes of different wall thicknesses or materials may be utilised or the spacing between the rollers may be varied, either by providing bolts 36 with hollow heads 18 having different spacings between the transverse bores provided to receive the journal pins 40 for the rollers, or by providing rollers 16 with different wall thicknesses and thus outer diameters or by adopting an arrangement which allows the position, in a particular hollow bolt or pin head 18, of one roller journal pin in relation to the other roller journal pin to be adjusted. Alternatively, or additionally, the deformable tubes used may have a cross-section or composition which varies around the circumference of the tube and the deformable tube may be connected with the respective seat mounting bracket 34 and hence with the structure of the aircraft, in such a manner as to allow the angular position of the tube about its axis, relative to the deforming means, to be adjusted. Alternatively the deforming means may be mounted in such a way as to allow its angular position around the tube axis to be adjusted, the adjustment, in each case, allowing the rate of energy absorption to be adjusted.

The tube deforming energy absorbers described with reference to the drawings can readily be made light and compact, can be made of corrosion resistant materials and can be manufactured and fitted economically, thereby to provide a cost-effective solution to the problem of effectively absorbing kinetic energy in crash situations, for example in crashworthy aircraft seats. The tube flattening arrangements described with reference to the drawings provide a predictable force versus deformation trace and the force versus deformation characteristics are not subject to unexpected changes in conditions of rapid loading rate. Furthermore, the energy absorbers so described meet, or can readily be made to meet, the other desiderata set out in the introductory part of this specification.

The tube flattening energy absorbing mechanism utilised in the energy absorbers described with reference to the drawings does not require tight manufacturing tolerances, in contrast to the rod drawing or swaging mechanisms used in known energy absorbers, so that predetermined performance characteristics can more readily be obtained at less manufacturing expense than is the case with known energy absorbers. Furthermore, as already noted above, the tube flattening mechanism described affords energy absorption which does not rely upon a high frictional component, so that performance is less subject than in known energy absorbers to environmental conditions and performance of the energy absorber is highly consistent in different environments.

Whilst, in the embodiments of the invention described, the deformable elongate member used is a round section tube which is preferably flattened between two rollers, it will be understood that the elongated deformable member may take other forms, having open or closed sections.

Whilst in the energy absorber of FIGS. 1 to 9, and that of FIGS. 13 and 14, the deforming arrangement comprises a pair of opposing parallel rollers, it will be understood that a deforming arrangement utilising a single roller opposing a fixed counter element can be used, or (as in the embodiment of FIGS. 10 to 12), the deforming arrangement may consist of opposing fixed counter elements, (the opposite sides of the forming element orifice in the die), for engagement with the elongate deformable member.

The term "deforming set" is used herein to below to refer to:
(a) a pair of opposing rollers, such as the rollers 16 in FIG. 1, spaced apart to define a gap through which the attenuation tube or other elongate deformable member is extended, or
(b) a single roller spaced from an opposing fixed member to define a gap through which the attenuation tube or other elongate deformable member is extended, or
(c) a pair of opposing fixed members, such as provided by opposing sides of the forming orifice in the die of FIGS. 10 to 12, spaced apart to define a gap through which the attenuation tube or other elongate deformable member is extended,
and which, in each case, serves to flatten the attenuation tube or deformable member as it is forced through said gap.

In variant embodiments,(not shown), the deforming arrangement may comprise several such deforming sets, spaced apart along the elongate deformable member in any combination of types (a), (b) or (c) above. Where a plurality of such deforming sets is provided, spaced apart along the attenuation tube or other elongate deformable member, these may be arranged at different angles with respect to one another, for example may be so arranged that the transverse axis along which a first deforming set flattens the tube is perpendicular to the transverse axis along which a second deforming set flattens the tube, so that the tube, once flattened in one transverse direction is effectively opened again and flattened in a perpendicular sense. As a further example, a first roller pair or other deforming set may be arranged to flatten the initially round attenuation tube to a flat strip and a second, succeeding roller pair or other attenuation deforming set may be arranged to additionally fold the resulting flat strip over on itself, about a longitudinal axis, and so on. The rollers or stationary members between which the deformable member passes are not necessarily flat, as viewed along the axis of the deformable member but may, for example, have convex or concave profiles.

The energy absorbers described with reference to the drawings may be modified relatively simply to provide any desired force/displacement characteristic, for example, so that rather than simply providing a uniform restraining force over the full extent of displacement of the seat/occupant combination, the restraining force increases towards the end of such displacement, (on the basis that, when applied to a crashworthy helicopter seat, such an energy absorber would be preferable to one which allowed the seat/occupant combination to descend under a constant restraining force for the full displacement permitted by the energy absorber, only to be suddenly arrested at the end of such displacement). Where the deformable member is a metal tube, the wall thickness or diameter of the tube might be varied throughout its length or the tube might be pre-deformed (flattened) to different amounts along its length, to secure such a characteristic, or the material or properties of the tube might be varied along its length, for example by heat treatment or by making the tube as a composite tube.

Likewise, energy absorbers of the general form described with reference to FIGS. 1 to 9 or FIGS. 10 to 12 or FIGS. 13 and 14 herein may be provided with different desired characteristics by using deformable tubes of different wall thicknesses, diameters, shapes, (e.g. with different degrees of pre-flattening) or different materials or material properties. Alternatively, or additionally, energy absorbers as described with reference to the drawings and which are otherwise of identical construction may be made to have different performance characteristics by being provided with deforming arrangements in which the gap between the rollers or equivalent fixed members is different.

Furthermore, an energy absorber in accordance with the invention may be constructed so as to allow a relatively simple mechanical adjustment, not involving replacement of parts, to be carried out, either manually or by some automatic means.

Whilst it generally desirable to have, in a crashworthy helicopter seat, a simple energy absorber of which the force/displacement characteristics give protection for both the light and heavy occupant, some situations may require adjustment to optimise the crashworthy properties of the seat and/or system.

The embodiments of the invention which use deformation of an attenuation tube for energy absorption lend themselves readily to providing manual or automatic adjustment of the energy absorbing characteristics. Adjustment may be achieved in a number of ways:
(1) Adjustment of wall thickness: this may be achieved by rotating, about its longitudinal axis, an attenuation tube, having a circular cross-section exterior and a non-circular internal cross-section, to various positions within the roller arrangement, so as to vary the force required to flatten or deform the tube and hence to alter the attenuation characteristics.
(2) Partially pre-deforming (flattening) the attenuation tube varying amounts:
(3) In a variation of the above theme, the outside of the attenuation tube can be of a non-circular form of constant or varying wall thickness. By rotation of the attenuation tube different parts of the periphery of the tube can be presented to the rollers or other deforming set so that different forces are needed to deform the tube, thus providing adjustment for different occupants.

(4) Varying the gap between the rollers or equivalent parts of the respective deforming set, thereby increasing or decreasing the force required to flatten/deform tube.

(5) Varying the roller diameter via tapered cones. In a similar fashion to (4) above, the gap that the tube is required to pass through may be either increased or decreased. By moving the rollers or fixed members as appropriate to present the desired diameter to the tube, thus changing the attenuation properties.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. An energy absorber for absorbing energy of a vehicle or component of a vehicle or occupant of the vehicle in a crash situation so as to allow relatively gradual deceleration of the vehicle, component or occupant, the energy absorber including a first part, second part and an elongate deformable member secured to the first part and extending through a deforming arrangement carried by the second part, wherein said elongated deformable member normally acts as a tie between said first part and said second part but wherein the arrangement is such that, when the force acting between said first part and s id second part in a predetermined direction exceeds a predetermined amount, said elongate deformable member is thereby forced progressively through said deforming arrangement as the distance between said first part and said second part changes and the deformable member is thereby forced to undergo plastic deformation, whereby energy is absorbed and wherein said deforming arrangement is such as to effect such plastic deformation substantially without changing the material cross sectional area of the deformable member, and wherein said deforming arrangement includes at least one roller, bearing on said elongate deformable member and rotatable about an axis transverse to the direction of elongation of the deformable member, and further includes an opposing member and wherein a flattened portion of said elongate deformable member extends between said roller and said opposing member.

2. An energy absorber for absorbing energy of a vehicle or component of a vehicle or occupant of the vehicle in a crash situation so as to allow relatively gradual deceleration of the vehicle, component or occupant, the energy absorber including a first part, second part and an elongate deformable member secured to the and extending through a deforming arrangement carried by the second part, whereby said elongate deformable member normally acts as a tie between said first part and said second part but wherein the arrangement is such that, when the force acting between said first part and aid second part in a predetermined direction exceeds a predetermined amount, said do gate deformable member is thereby forced progressively through said deforming arrangement as the distance between said first part and said second part changes and the deformable member is thereby forced to undergo plastic deformation, whereby energy is absorbed and wherein said deforming arrangement is such as to effect such plastic deformation substantially without changing the material cross sectional area of the deformable member, and wherein said deforming arrangement includes a pair of rollers rotatable about respective axes transverse to the direction of elongation of the deformable member and wherein a flattened portion of said elongate deformable member extend between said rollers.

3. An energy absorber for absorbing energy of a vehicle or component of a vehicle or occupant of the vehicle in a crash situation so as to allow relatively gradual deceleration of the vehicle, component or occupant the energy absorber including a first part, a second part and an elongate deformable member secured to the first part and extending through a deforming arrangement carried by he second part, whereby said elongate deformable member normally acts as a tie between said first part and said second part but wherein the arrangement is such that, when the force acting between said first part and said second part in a predetermined direction exceeds a predetermined amount, said elongate deformable member is thereby forced progressively through said deforming arrangement as the distance between said first part nd said second part changes and the deformable member is thereby forced to undergo plastic deformation, whereby energy is absorbed, and wherein said deforming arrangement is such as to effect such plastic deformation substantially without changing the material cross sectional area of the deformable member, wherein said deforming arrangement includes at least one roller, bearing on said elongate deformable member an rotatable about an axis transverse to the direction of elongation of the deformable member, and further includes an opposing member and wherein a flattened portion of said elongate deformable member extends between said roller and said opposing member and wherein the spacing of said roller from said opposing member is adjustable to adjust the extent to which the elongate member is flattened in passing through said deforming arrangement and thus to adjust the rate of energy absorption in operation.

4. An energy absorber for absorbing energy of a vehicle or component of a vehicle or occupant of the vehicle in a crash situation so as to allow relatively gradual deceleration of the vehicle, component or occupant, the energy absorber including a first part, a second part and an elongate deformable member secured to the first part and extending through a deforming arrangement carried by the second part, whereby said elongate deformable member normally acts as a tie between said first part and said second part but wherein the arrangement is such that, when the force acting between said first part and said second part in a predetermined direction exceeds a predetermined amount, said elongate deformable member is thereby forced progressively through said deforming arrangement as the distance between said first part and said second part changes and the deformable member is thereby forced to undergo plastic deformation, whereby energy is absorbed, and wherein said deforming arrangement is such as to effect such plastic deformation substantially without changing the material cross sectional area of the deformable member, wherein said deforming arrangement includes a pair of rollers rotatable about respective axes transverse to the direction of elongation of the deformable member and wherein a flattened portion of said elongate deformable member extends between said rollers, and wherein the spacing between said rollers is adjustable to adjust the extent to which the elongate member is flattened passing through said deforming arrangement and thus to adjust the rate of energy absorption in operation.

* * * * *

UNITED STATES PATENT AND TRADEMARK OFFICE
CERTIFICATE OF CORRECTION

PATENT NO. : 6,820,931 B2
DATED : November 23, 2004
INVENTOR(S) : Steven Anthony George Ruff and Graham Philip Hartnell It is certified that error appears in the above-identified patent and that said Letters Patent is hereby corrected as shown below:

<u>Column 9,</u>
Line 27, delete "wherein" and insert -- whereby --.
Line 31, delete "s id" and insert -- said --.
Line 53, after "secured to the" insert -- first part --.
Line 58, delete "aid" and insert -- said --.
Line 59, delete "do gate" and insert -- elongate --.

<u>Column 10,</u>
Line 20, delete "nd" and insert -- and --.
Line 27, delete "an rotatable" and insert -- and rotatable --.

Signed and Sealed this

Twelfth Day of April, 2005

JON W. DUDAS
*Director of the United States Patent and Trademark Office*